Aug. 17, 1943.   B. G. CARLSON   2,327,171
AIRCRAFT CONTROL DEVICE
Filed April 13, 1942   3 Sheets-Sheet 1

INVENTOR.
BERT G. CARLSON.
BY
Frank H. Harmon
ATTORNEY.

Aug. 17, 1943.  B. G. CARLSON  2,327,171
AIRCRAFT CONTROL DEVICE
Filed April 13, 1942  3 Sheets-Sheet 2

Fig. 2.

INVENTOR.
BERT G. CARLSON.
BY
Frank H. Harmon
ATTORNEY.

Aug. 17, 1943.  B. G. CARLSON  2,327,171
AIRCRAFT CONTROL DEVICE
Filed April 13, 1942  3 Sheets-Sheet 3
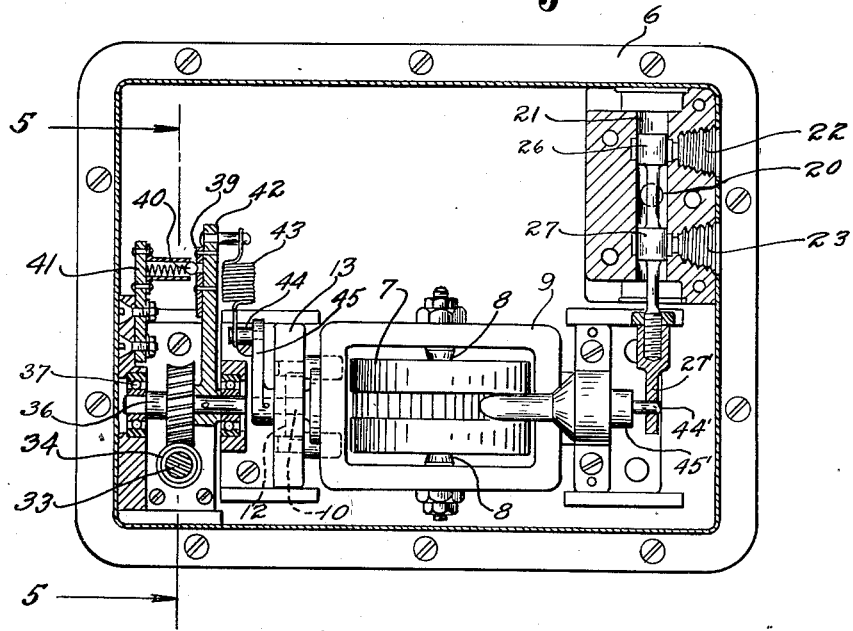
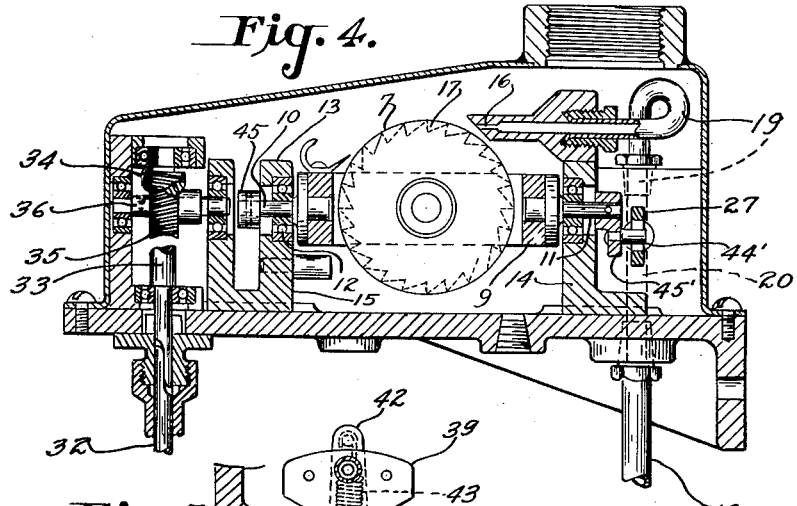
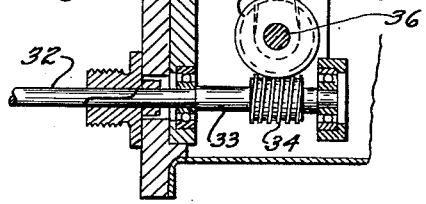
INVENTOR.
BERT G. CARLSON.
BY
Frank H. Harmon
ATTORNEY.

Patented Aug. 17, 1943

2,327,171

UNITED STATES PATENT OFFICE 2,327,171

AIRCRAFT CONTROL DEVICE

Bert G. Carlson, Erieside, Ohio, assignor to Jack & Heintz, Inc., Bedford, Ohio, a corporation of Ohio Application April 13, 1942, Serial No. 438,749

8 Claims. (Cl. 244—78)

This invention relates in general to automatic pilots for aircraft and more particularly to an automatic control for the amount and rate of rudder operation.

In the conventional hydraulic automatic pilot the gyro is air spun and its precession movements are transmitted through an air operated relay to the hydraulic system and to the aircraft control surfaces. One of the disadvantages of the conventional system, with respect more particularly to rudder control, is the tendency of the automatic pilot toward over control as the aircraft yaws off course in normal straightaway flight. Another disadvantage is the difficulty encountered in controlling the desired amount and rate of turn.

An object of this invention is to provide a means whereby the amount of rudder applied will vary directly with the rate at which the aircraft yaws off course and to provide a combined amount and rate follow-up system that will minimize or eliminate over controlling of the rudder.

Another object is to provide a simple control system whereby the desired new compass course, or amount of turn, as well as the rate of turn may be manually set and then the actual turn set and initiated and continued at the predetermined rate until completed, all without overcontrol of the rudder due to sudden tendencies toward yawing.

According to the present invention there is provided the conventional air spun gyro and air relay to take charge of the hydraulic servo for normal straightaway flight. Interjected into the hydraulic system is an oil spun gyro with its own balanced oil valve. The oil spun gyro is sufficiently spring loaded so for normal straightaway flight it does not precess or interfere with the conventional one operated by the air relay diaphragm. However, for purposes of controlling the amount and rate of a turn, when the oil is shut off from the air relay operated balanced oil valve, the balanced oil valve of the oil spun gyro regulates flow of oil to the servo motor and consequently takes charge of the operation of the rudder to the exclusion of the balanced oil valve that is operated by the air relay.

The manual control system for the automatic pilot comprises three control knobs, one of which controls the operation of the conventional part of the automatic pilot, one which turns off and on the flow of oil supply to the main balanced oil valve in the hydraulic circuit and one which regulates the rate of turn through the oil spun gyro and its associated balanced oil valve to the rudder servo motor.

With the foregoing and other objects in view, the invention consists in the combination of parts and in the details of construction hereinafter set forth in the following specification and appended claims, certain embodiments thereof being illustrated in the accompanying drawings, in which:

Figure 2 is a schematic view of the control system showing certain parts in transverse section;

Figure 3 is a view in transverse section through the oil spun gyro housing and assembly;

Figure 4 is a view in section through the oil spun gyro housing and assembly taken at right angles to Figure 3; and Figure 5 is a partial detail view in elevation of the adjustable biasing spring for the oil spun gyro and taken on the line 5—5 of Fig. 3.

Figure 1:
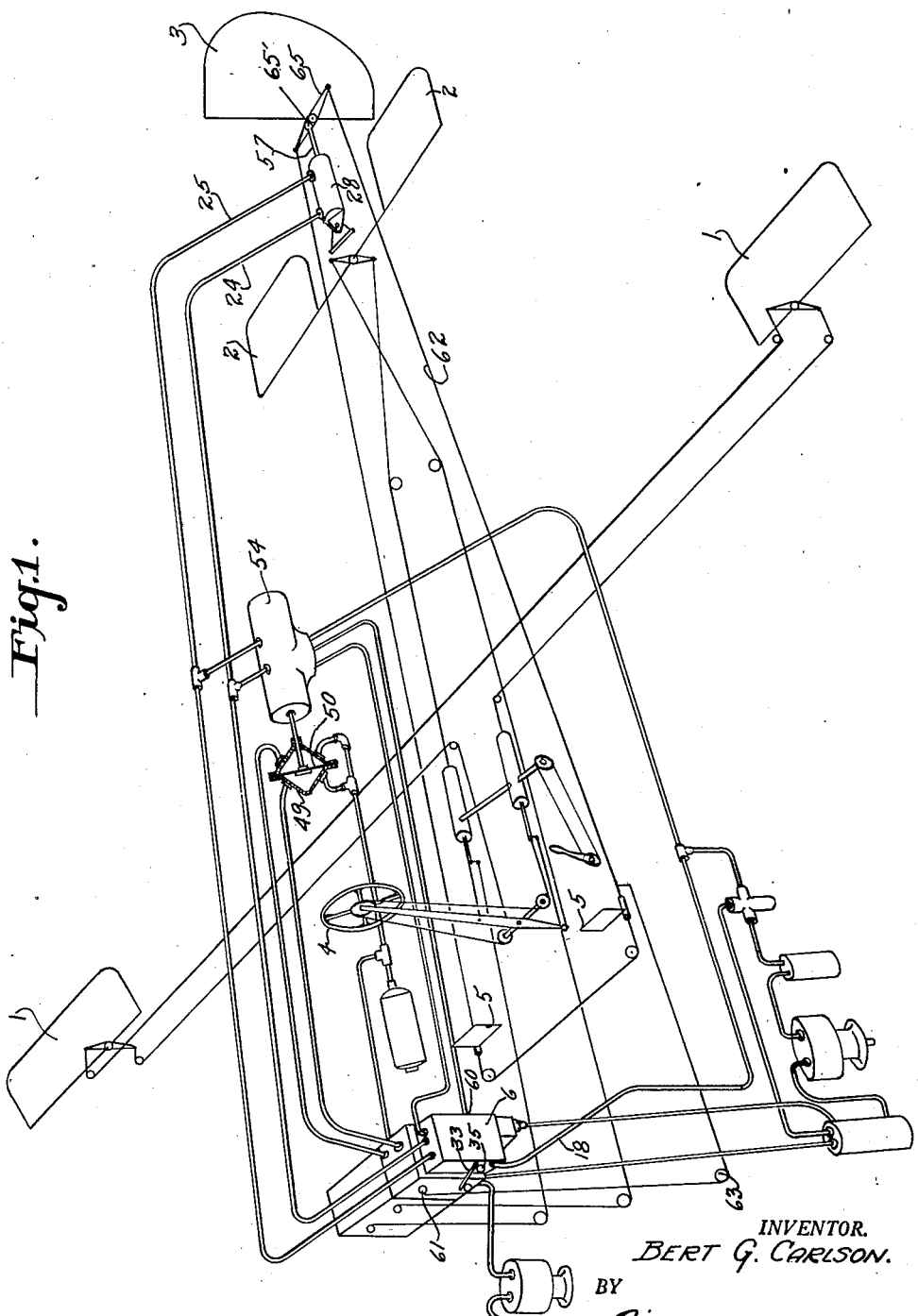
Figure 1 is a schematic view of the control system as applied to the aircraft control surfaces.

Referring more particularly to the drawings, Figure 1 shows the conventional arrangement of aircraft ailerons 1, elevators 2 and rudder 3 as well as the manual wheel control 4 and associated cables for operating the ailerons and elevators and the conventional rudder pedals 5 and associated cables for operating the rudder.

As stated before, the present invention is more particularly directed to improvements in amount and rate of rudder control and, as far as structure is concerned, it mainly comprises the addition into an air relay controlled hydraulic system of an oil spun gyro for controlling a balanced oil valve regulating flow of pressure oil to the rudder servo cylinder in addition to the conventional air relay controlled balanced oil valve regulating flow of oil to the same rudder servo cylinder.

As shown in Figures 2, 3, 4 and 5, the oil spun gyro assembly includes a casing 6 and a directional type of gyro rotor 7 mounted on horizontal pivots 8 in a gimbal 9 to form a spinning axis corresponding normally to the longitudinal axis of the aircraft. The gimbal 9 is provided with trunnions 10 and 11 for rotation in suitable bearings 12 and 13 in supports 14 and 15 carried by the casing. Also supported by the bracket 14 is an oil jet 16 to discharge oil under pressure to the gyro wheel buckets 17 to spin the wheel. The oil supply pipe 18 leads into the casing and through the passageway 19 to the oil jet 16 and through the passageway 20 to the cylinder 21. The passageways 22 and 23 leading to pipes 24 and 25 are opened and closed by the pistons 26 and 27. The balanced oil valves 26 and 27 have a connecting rod member 27' joining the piston of the oil valve to the offset pin 44' in the bell crank 45' which is stationed to the trunnion 11. Any precessional movements of the gimbal 9 will automatically displace the pistons 26 and 27 and cause the consequent reactions therefrom to actuate the servo piston 29 and rudder 30 in proportional degree. The furnishing of oil under pressure through pipe 24 or 25 into the hydraulic servo cylinder 28 on either side of the piston 29 causes oil to be forced out of the cylinder on the other side of the piston and out through the corresponding other pipe and causes a movement of the rudder 30 in the corresponding direction. In the position shown in Figures 2 and 3 both passages 22 and 23 are closed by pistons 26 and 27.

Operation of the "rate" knob 31, through appropriate shafting represented in dot and dash line 32 effects a rotation of shaft 33 and its worm 34 engaging a worm wheel 35 carried by a shaft 36 mounted in bearings 37 and 38. Shaft 36 carries a segmental plate 39 fixed thereto which is provided with appropriate recesses to be engaged by a fixed spring detent 40 carried by the casing bracket 41 so as to resiliently maintain the plate in various adjusted positions. The plate 39 has fixed thereto an arm 42 to receive one end of a tension coil spring 43 whose other end is secured to a pin 44 of a crank 45 keyed to the gimbal trunnion 10. Thus an adjustment of control knob 31, shaft 32 and 33, effects a spring loaded biasing of the gimbal and its rotor, which in this case is only mounted for two directions of freedom, either to the left or right and to a predetermined degree as indicated by the control knob dial 31.

For normal straightaway flight the conventional air spun gyro and air relay controlled balanced oil valve is used for operating the rudder servo. The air spun gyro assembly in the casing 46 includes any suitable air spun gyro of the directional type and any suitable air pick off for leading air under pressure through tube 47 or 48 to the air relay 49 on either side of the diaphragm 50 for the actuation of the balanced oil valve 51, 52, 53 in casing 54 for regulating flow of pressure oil through pipe 55 or 56 to the hydraulic servo cylinder 28 to either side of the piston 29 for operating the rudder 30 through the piston rod 57 in either direction.

When it is desired to make an ordinary turn with the conventional part of the automatic pilot, without using the oil spun gyro assembly and without regard to predetermining the rate of turn, the knob 59 is left in the "off" position leaving the oil stop valve 60 open for distribution of pressure oil to the balanced oil valve in casing 54. Turning of knob 58, through conventional gearing as shown in Figure 2, biases the air spun rotor assembly in casing 46, and through the conventional differential 59, the follow-up, including shaft 60 and cable 62 about pulleys 61, 63 and 64 is operated and thereby the rudder is operated through the rudder control horn 65, on its pivot 65'.

It will be seen, that despite the previously described spring loading of the oil spun gyro in the casing 6, if an abnormal yaw occurs and if there is any tendency toward overcontrol by the rudder, the oil spun gyro assembly will temporarily overcome its spring loading and take charge to eliminate such over control. In this manner the amount of rudder applied varies directly with the rate at which the aircraft yaws off course and the combined amount and rate follow-up eliminates over control.

In operation for automatic turns the control knob 59 is turned to "on" position which through the oil stop valve shuts off the supply of oil to the main balanced oil valve in casing 54. The control knob 58 is then rotated until the top compass card 66 indicates in calibrated degrees the heading of the new course to be flown. The control knob 31 is then turned, to the left or right as required, to index 68 denoting the rate of turn desired. As previously explained the turning of knob 31, through shafting 32, 33 and 34 and 35 puts the oil spun gyro 7 under flexible bias through spring 43 and consequently the balanced oil valve 26, 27 regulates the flow of oil pressure oil to either side of the piston 29 in the rudder servo cylinder 28. The turn thus initiated will continue until the "off-on" control knob 59 is turned to "off" position and the "rate" control knob 31 is turned to zero position. In other words, the fixed rate of turn will continue as long as necessary. Knob 59 should be turned to "off" position and knob 31 should be returned to zero position within 30 degrees, plus or minus spread of the two compass cards 66 and 67 in order to straighten out on the compass heading set for 10 to 15 degrees in advance on approaching a course originally set to avoid over run. If this spread has been exceeded the control knob 31 should be turned hard over, in the corresponding direction, and returned to zero position when the compass cards 66 and 67 approach alignment within the 60 degree spread.

From the foregoing, it will be seen that there has been provided an automatic pilot system wherein the amount of rudder applied will vary directly with the rate at which the aircraft yaws off course and wherein the combined amount and rate follow-up will eliminate over control. It will also be seen that the oil spun gyro assembly and balanced oil valve controlled thereby under control of the "rate" knob effectively brings about a controlled rate of turn and may be readily installed as a unit in the hydraulic system of any conventional hydraulic automatic pilot.

I claim:

1. An automatic pilot for aircraft including an air spun directional gyro and an air pick-off operated air relay and hydraulic rudder operating servo motor system including a follow-up system and a motor actuating balanced oil valve connected to said air relay to be operated thereby, an adjustable spring-loaded oil spun gyro and balanced oil valve operated thereby incorporated in the hydraulic system of said automatic pilot, a control knob and associated members for adjusting the spring biasing of said oil spun gyro for predetermining a rate of aircraft turn, a control knob and associated shut-off valve for confining pressure oil flow to said oil spun gyro assembly for effecting said turn and for distributing flow of pressure oil to the entire hydraulic system for normal straightaway flight and a control knob and associated differential gearing for operating said air spun gyro, air pick-off and follow-up system.

2. An automatic pilot for aircraft including means for automatically controlling the degree of rudder control so that it will vary directly with the rate at which said aircraft yaws off of course, said means including an air spun directional gyro and an air pick-off operated air relay and hydraulic rudder operating servo motor system including a follow-up system and a motor actuating balanced oil valve connected to said air relay to be operated thereby, an adjustable spring-loaded oil spun gyro and balanced oil valve operated thereby incorporated in the hydraulic system of said automatic pilot, a control knob and associated members for adjusting the spring biasing of said oil spun gyro for predetermining a rate of aircraft turn, a control knob and associated shut-off valve for confining pressure oil flow to said oil spun gyro assembly for effecting said turn and for distributing flow of pressure oil to the entire hydraulic system for normal straightway flight and a control knob and associated differential gearing for operating said air spun gyro, air pick-off and follow-up system.

3. An automatic pilot for aircraft including means for automatically controlling the amount and rate of rudder control and turn of said aircraft, said means including an air spun directional gyro and an air pick-off operated air relay and hydraulic rudder operating servo motor system including a follow-up system and a motor actuating balanced oil valve connected to said air relay to be operated thereby, an adjustable spring-loaded oil spun gyro and balanced oil valve operated thereby incorporated in the hydraulic system of said automatic pilot, a control knob and associated members for adjusting the spring biasing of said oil spun gyro for predetermining a rate of aircraft turn, a control knob and associated shut-off valve for confining pressure oil flow to said oil spun gyro assembly for effecting said turn and for distributing flow of pressure oil to the entire hydraulic system for normal straightaway flight and a control knob and associated differential gearing for operating said air spun gyro, air pick-off and follow-up system.

4. An automatic pilot for aircraft including means for automatically controlling the amount and rate of rudder control and turn of said aircraft, said means including an air spun directional gyro and an air pick-off operated air relay and hydraulic rudder operating servo motor system including a follow-up system and a motor actuating balanced oil valve connected to said air relay to be operated thereby, an adjustable spring-loaded oil spun gyro and balanced oil valve operated thereby incorporated in the hydraulic system of said automatic pilot, means for adjusting the spring biasing of said oil spun gyro for predetermining a rate of aircraft turn, a shut-off valve for confining pressure oil flow to said oil spun gyro assembly for effecting said turn and for distributing flow of pressure oil to the entire hydraulic system for normal straightaway flight and means for operating said air spun gyro, air pick-off, and follow-up system.

5. An automatic pilot for aircraft including an air spun directional gyro and an air pick-off operated air relay and hydraulic rudder operating servo motor system including a follow-up system and a motor actuating balanced oil valve connected to said air relay to be operated thereby, an adjustable spring-loaded oil spun gyro and balanced oil valve operated thereby incorporated in the hydraulic system of said automatic pilot, means for adjusting the spring biasing of said oil spun gyro for predetermining a rate of aircraft turn, means for confining pressure oil flow to said oil spun gyro assembly for effecting said turn and for distributing flow of pressure oil to the entire hydraulic system for normal straightaway flight and means for operating said air spun gyro, air pick-off and follow-up system.

6. An automatic pilot for aircraft including an air spun directional gyro and an air pick-off operated air relay and hydraulic rudder operating servo motor system including a follow-up system and a motor actuating balanced oil valve connected to said air relay to be operated thereby, an adjustable spring-loaded oil spun gyro and balanced oil valve operated thereby incorporated in the hydraulic system of said automatic pilot, control means for adjusting the spring biasing of said oil spun gyro for predetermining a rate of aircraft turn, a control valve for confining pressure oil flow to said oil spun gyro assembly for effecting said turn and for distributing flow of pressure oil to the entire hydraulic system for normal straightaway flight and control means for operating said air spun gyro, air pick-off and follow-up system.

7. An automatic pilot for aircraft including an air spun directional gyro and an air pick-off operated air relay and hydraulic rudder operating servo motor system including a follow-up system and a motor actuating balanced oil valve connected to said air relay to be operated thereby, an adjustable spring-loaded fluid spun gyro and balanced oil valve operated thereby, a control knob and associated members for adjusting the spring biasing of said fluid spun gyro for predetermining a rate of aircraft turn, a control knob and associated shut-off valve for confining pressure fluid flow to said fluid spun gyro assembly for effecting said turn and for distributing flow of pressure fluid to said hydraulic system for normal straightaway flight and a control knob and associated differential gearing for operating said air spun gyro, air pick-off and follow-up system.

8. An automatic pilot for aircraft including an air spun directional gyro and an air pick-off operated air relay and hydraulic rudder operating servo motor system including a follow-up system and a motor actuating balanced oil valve connected to said air relay to be operated thereby, means for automatically predetermining the rate and amount of rudder control and aircraft turn, said means including an adjustable spring-loaded oil spun gyro and balanced oil valve operated thereby incorporated in the hydraulic system of said automatic pilot, a control means for adjusting the spring biasing of said oil spun gyro for predetermining a rate of aircraft turn, control means including a shut off valve for confining pressure oil flow to said oil spun gyro assembly for effecting said turn and for distributing flow of pressure oil to the entire hydraulic system for normal straightaway flight and a control means for operating said air spun gyro, air pick-off and follow-up system.

BERT G. CARLSON.